US012786901B2

(12) United States Patent
Kenney et al.

(10) Patent No.: US 12,786,901 B2
(45) Date of Patent: Nov. 3, 2026

(54) RADIO FREQUENCY (RF) COMMUNICATIONS SYSTEM HAVING RF NODES THAT REACQUIRE SYNCHRONIZATION LOCK ON FREQUENCY DIVERSE, REDUNDANT DATA CHANNELS

(71) Applicant: L3HARRIS TECHNOLOGIES, INC., Melbourne, FL (US)

(72) Inventors: Brent A. Kenney, Bountiful, UT (US); Jeffrey B. Bench, Lehi, UT (US); Marc A. Padilla, Farmington, UT (US); Nicholas T. Yaskoff, Park City, UT (US)

(73) Assignee: L3HARRIS TECHNOLOGIES, INC., Melbourne, FL (US)

( * ) Notice: Subject to any disclaimer, the term of this patent is extended or adjusted under 35 U.S.C. 154(b) by 523 days.

(21) Appl. No.: 18/051,036

(22) Filed: Oct. 31, 2022

(65) Prior Publication Data

US 2024/0188007 A1 Jun. 6, 2024

(51) Int. Cl.
*H04W 56/00* (2009.01)
*H04W 74/08* (2024.01)

(52) U.S. Cl.
CPC ..... *H04W 56/0005* (2013.01); *H04W 56/001* (2013.01); *H04W 74/08* (2013.01)

(58) Field of Classification Search
CPC ........... H04W 56/0005; H04W 56/001; H04W 56/002; H04J 3/0638; H04L 12/422; H04M 2203/554; H04B 1/74; H04B 7/2678
See application file for complete search history.

(56) References Cited

U.S. PATENT DOCUMENTS 8,380,126 B1 * 2/2013 Ma ............................ H04L 1/22 455/509
8,509,161 B2 8/2013 Imamura
(Continued)

FOREIGN PATENT DOCUMENTS

WO 2008000069 1/2008

OTHER PUBLICATIONS

Wang et al., "Switching Rates of Two-Branch Selection Diversity in Correlated Rayleigh Doppler Fading Channels," 2009 Canadian Conference on Electrical and Computer Engineering; 2009; pp. 148-151.

(Continued)

*Primary Examiner* — Un C Cho
*Assistant Examiner* — Theodore Im
(74) *Attorney, Agent, or Firm* — ALLEN, DYER, DOPPELT, GILCHRIST, P.A.

(57) ABSTRACT

A radio frequency (RF) communications system may include a first RF node that transmits redundant data channels on different RF frequencies and transmits a control channel for synchronization lock with at least one other RF node. A second RF node may receive the redundant data channels on the different RF frequencies that are subject to RF disruption so that a disrupted redundant data channel loses synchronization lock. The second RF node may reacquire synchronization lock for the disrupted redundant data channel based upon data within another redundant data channel and in a shorter time than reacquiring synchronization lock using the control channel.

17 Claims, 8 Drawing Sheets

(56) References Cited

U.S. PATENT DOCUMENTS

| | | | |
|---|---|---|---|
| 8,687,480 B2 | 4/2014 | Jia et al. | |
| 8,737,280 B2 | 5/2014 | Mujtaba et al. | |
| 8,761,701 B2 | 6/2014 | Ramasamy et al. | |
| 9,130,689 B1 | 9/2015 | Giallorenzi et al. | |
| 11,070,348 B1 | 7/2021 | Po-Han et al. | |
| 2008/0240050 A1 | 10/2008 | Ngan-Cheung | |
| 2010/0278526 A1* | 11/2010 | Duan | H04B 10/506 398/5 |
| 2011/0038284 A1 | 2/2011 | Senarath et al. | |
| 2012/0140654 A1* | 6/2012 | Pak | H04B 1/74 370/252 |
| 2013/0128998 A1 | 5/2013 | Tanno et al. | |
| 2016/0150474 A1* | 5/2016 | Ang | H04W 52/0293 370/311 |
| 2019/0132784 A1 | 5/2019 | Thubert et al. | |
| 2019/0174554 A1* | 6/2019 | Deenoo | H04B 7/0617 |
| 2019/0190635 A1* | 6/2019 | Goel | H04W 56/001 |
| 2019/0190747 A1* | 6/2019 | Park | H04B 7/0639 |
| 2020/0084736 A1 | 3/2020 | Regunathan et al. | |
| 2020/0236607 A1 | 7/2020 | Zhu et al. | |
| 2020/0259896 A1* | 8/2020 | Sachs | H04L 67/12 |
| 2020/0337004 A1 | 10/2020 | Li et al. | |
| 2021/0076339 A1 | 3/2021 | Kalhan | |
| 2021/0168574 A1* | 6/2021 | Zhang | H04L 5/0048 |
| 2021/0258963 A1 | 8/2021 | Sakhnini et al. | |
| 2022/0006582 A1* | 1/2022 | Yamada | H04W 72/1273 |
| 2022/0346067 A1* | 10/2022 | Tanaka | H04W 56/002 |
| 2023/0189169 A1 | 6/2023 | Vivanco et al. | |
| 2023/0247570 A1* | 8/2023 | Liu | H04W 56/002 370/329 |
| 2023/0354225 A1* | 11/2023 | Kwak | H04W 24/08 |
| 2024/0073834 A1* | 2/2024 | Zhang | H04W 24/10 |
| 2024/0098664 A1* | 3/2024 | Baldemair | H04W 56/0015 |

OTHER PUBLICATIONS

Le Naour et al., "Performance of the FASTNET narrowband VHF frequency hopping tactical radio in challenging multipath environments", IEEE Military Communications Conference, 2014, pp. 649-656.

* cited by examiner

RADIO FREQUENCY (RF) COMMUNICATIONS SYSTEM HAVING RF NODES THAT REACQUIRE SYNCHRONIZATION LOCK ON FREQUENCY DIVERSE, REDUNDANT DATA CHANNELS

FIELD OF THE INVENTION

The present invention relates to the field of communication systems, and, more particularly, to a radio frequency (RF) communications system having RF nodes that transmit redundant data channels and related methods.

BACKGROUND OF THE INVENTION

Some modern waveforms used in communication systems, such as the Advanced Tactical Data Link (ATDL) waveform, may use frequency diversity to address frequency selective loss or signal interference in the communications link. For example, two copies of the data channel may be transmitted from an RF node that is configured to transmit RF signals at different frequencies, and both RF signals are received at another RF node as a receiver in a point-to-point communications link or mesh network. Fast fading or abrupt interference may cause one of the data channels to lose synchronization lock, but the communications link may be uninterrupted due to the transmission of the redundant data channel in the communications link.

Due to the nature of the data channel, synchronization cannot be re-established quickly, and the data channel that lost its synchronization lock must wait for the acquisition information to be transmitted on a control channel before re-establishing the communications link by acquiring a synchronization lock using that control channel. The delay for receiving the acquisition information on the control channel may be on the order of seconds, for example, because the control channel may also operate as a contention control channel. It is possible for the acquisition information to be contained in the redundant data channels without a control channel. In this configuration, the period of the acquisition information is also on the order of seconds. The acquisition information interrupts the data in this case, so it must be kept to a minimum. During the interim between acquisition information, where one of the data channels has lost synchronization lock, there is no redundancy in the communications link, and if the other RF signal at the other frequency has communication errors, data may be lost.

In a communications system using ATDL and similar waveforms, spatial diversity may also be employed to mitigate losses due to platform or antenna gain pattern blockages. For example, two copies of the data channel may be transmitted from different antennas at one RF node, such as an aircraft. The two copies of the data channel are both received at another RF node, which could be another aircraft, ground-based receiver, a satellite or other RF node as non-limiting examples.

However, one of the transmit antennas may be blocked in its communications, such as when an aircraft performs a complex maneuver or changes direction. The communications link is still uninterrupted due to the redundancy in the data channels. As in the case with a frequency diversity communications link, however, the data channel that lost the synchronization lock must wait for the acquisition information to be transmitted on the control channel before reestablishing the communications link. This delay to wait for the reacquisition information may be more than one second as noted before, and during the interim, there is no redundancy for the communications link, and further communications data may be lost when the other signal has interference. A fast reacquisition may be desirable in these scenarios, where one of the redundant data channels loses synchronization lock.

SUMMARY OF THE INVENTION

In general, a radio frequency (RF) communications system may comprise a first RF node configured to transmit redundant data channels on a plurality of respective different RF frequencies, and also configured to transmit a control channel for synchronization lock with at least one other RF node. A second RF node may be configured to receive the redundant data channels on the plurality of respective different RF frequencies and being subject to RF disruption so that a disrupted redundant data channel loses synchronization lock, and reacquire synchronization lock for the disrupted redundant data channel based upon data within another redundant data channel, and in a shorter time than reacquiring synchronization lock using the control channel.

Each redundant data channel may comprise a plurality of header blocks and a respective data block following each header block. Each redundant data channel may comprise a respective synchronization field associated with each header block, and wherein the second RF node uses at least one synchronization field to reacquire synchronization lock. The control channel may comprise an acquisition block for acquiring synchronization repeating at a rate slower than a transmission rate of the respective synchronization field associated with each header block.

Each redundant data channel may comprise state and timing data for another redundant data channel. The control channel may operate as a contention control channel.

In some embodiments, at least one other RF node may define a mesh network. In other embodiments, the first and second RF nodes may define a point-to-point communication link. Each RF node may comprise an RF transceiver and a controller coupled thereto.

In another embodiment, a radio frequency (RF) communications system may comprise a first RF node configured to transmit redundant data channels on a plurality of respective different RF frequencies. Each redundant data channel may comprise a plurality of header blocks occurring at a first frequency. Each header block may have a synchronization field associated therewith. An acquisition block may occur at a second frequency less than the first frequency. A second RF node may be configured to receive the redundant data channels on the plurality of respective different RF frequencies and being subject to RF disruption so that a disrupted redundant data channel loses synchronization lock, and reacquire synchronization lock for the disrupted redundant data channel based upon data within another redundant data channel and in a shorter time than reacquiring synchronization lock using the acquisition block.

Another aspect is directed to a method of radio frequency (RF) communications that may comprise operating a first RF node to transmit redundant data channels on a plurality of respective different RF frequencies, and also to transmit a control channel for synchronization lock with at least one other RF node. The method may also include operating a second RF node to receive the redundant data channels on the plurality of respective different RF frequencies and being subject to RF disruption so that a disrupted redundant data channel loses synchronization lock, and reacquire synchronization lock for the disrupted redundant data channel based upon data within another redundant data channel and in a shorter time than reacquiring synchronization lock using the control channel.

BRIEF DESCRIPTION OF THE DRAWINGS

Other features and advantages of the present invention will become apparent from the detailed description of the embodiments which follow, when considered in light of the accompanying drawings in which.

DETAILED DESCRIPTION

The present description is made with reference to the accompanying drawings, in which exemplary embodiments are shown. However, many different embodiments may be used, and thus, the description should not be construed as limited to the particular embodiments set forth herein. Rather, these embodiments are provided so that this disclosure will be thorough and complete. Like numbers refer to like elements throughout.

Figure 1:
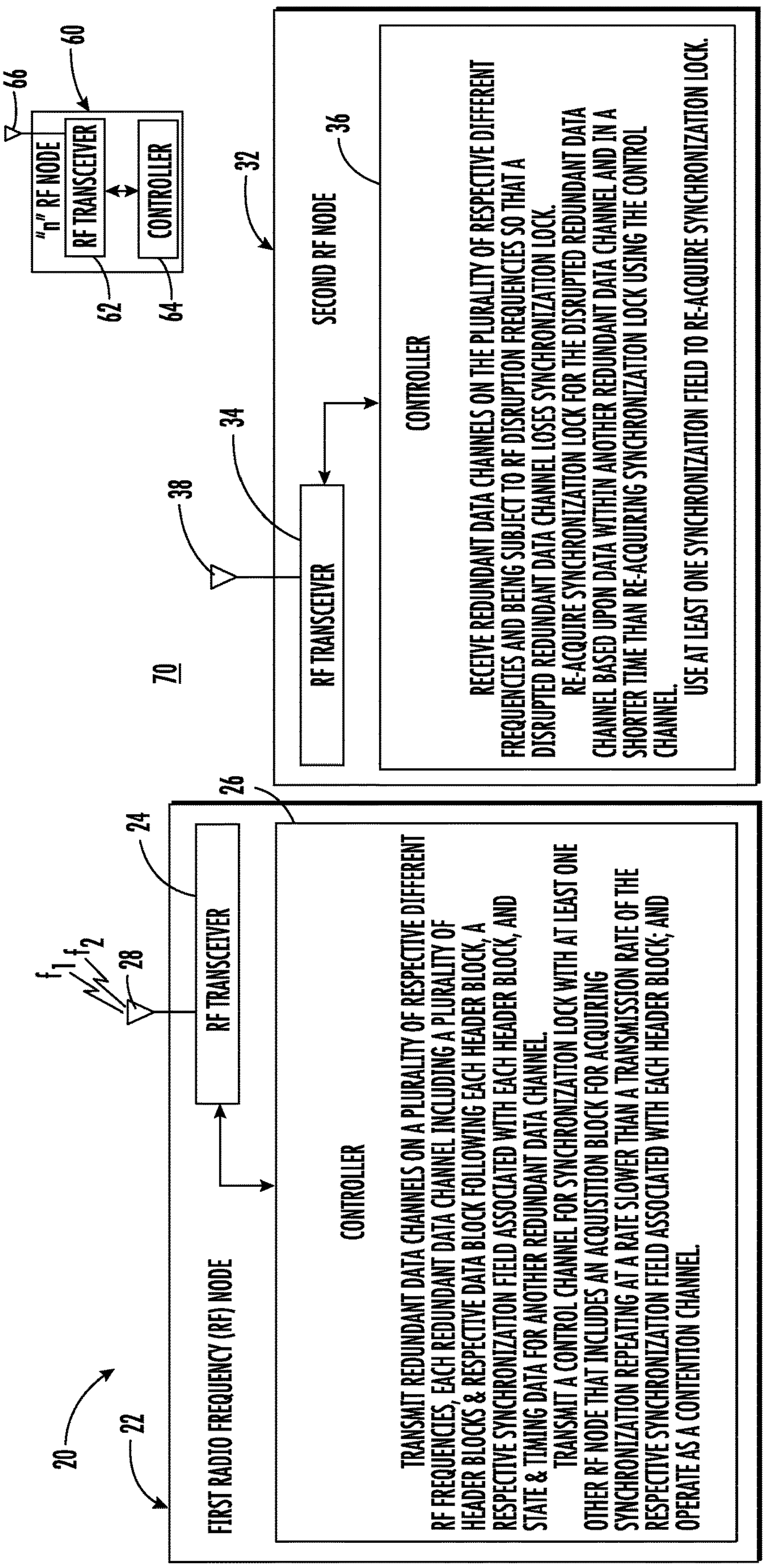
FIG. 1 is a high-level block diagram of the RF communications system showing RF nodes that reacquire synchronization lock on frequency diverse, redundant data channels in accordance with a non-limiting example.

Referring initially to FIG. 1, a radio frequency (RF) communications system is illustrated generally at 20, and shows a first RF node 22 that includes a first RF transceiver 24 and a first controller 26 coupled thereto. This first RF node 22 is configured to transmit redundant data channels 42 (FIG. 3) on a plurality of different RF frequencies as illustrated by the two RF signals designated f1 and f2 generated from the first RF transceiver 24 and first antenna 28 coupled thereto. The first RF node 22 is also configured to transmit a control channel 44 (FIGS. 2 and 3) for synchronization lock with at least one other RF node, such as the illustrated second RF node 32, which is configured to receive the redundant data channels on the plurality of respective different frequencies.

The second RF node 32 includes a second RF transceiver 34 and a second controller 36 connected thereto and a second antenna 38. This second RF node 32 is subject to RF disruption so that a disrupted redundant data channel 42 loses synchronization lock, but may reacquire a synchronization lock for that disrupted redundant data channel based upon data within another redundant data channel, and within a shorter time period, than reacquiring synchronization lock using a control channel 44. Each of the first and second RF transceivers 24, 34 may include multiple RF circuits for generating, receiving and processing RF signals at different frequencies, such as the illustrated f1 and f2.

Figure 2:
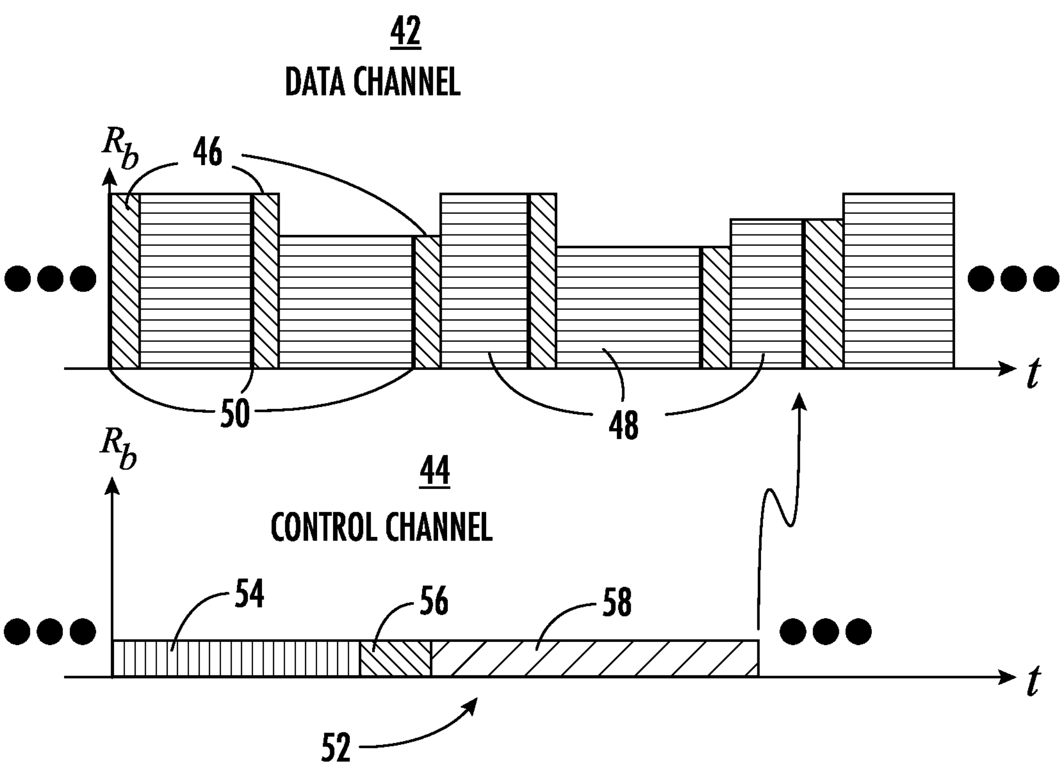
FIG. 2 is a time versus rate plot of a data channel and control channel used in the RF communications system of FIG. 1 or FIG. 6.

As shown in the schematic diagram of the data channel 42 and control channel 44 in FIG. 2, each redundant data channel 42 includes a plurality of header blocks 46 and respective data blocks 48, each having a data payload and a respective data block following each header block. A respective synchronization field 50 is associated with each header block 46. The second RF node 32 uses at least one synchronization field 50 to reacquire synchronization lock. In an example, the start time of the synchronization field comes from the information tracked by the unblocked data channel.

For example, each redundant data channel 42 includes the header blocks 46, each having the synchronization field 50. State and timing information are not included in the synchronization fields. The synchronization field is used by a correlator to identify the start of the header. State and timing data come from the receiver of the unblocked data channel. The control channel 44 may be a contention control channel, and thus, for that reason, requires some off-time. The data for reacquiring synchronization lock in the control channel 44 is transmitted infrequently, on the order of seconds, and thus, requires that off-time.

The control channel 44 as shown in FIG. 2 includes an acquisition block 52 having a preamble 54, a header 56, and acquisition data 58. This acquisition block 52 includes information and data for acquiring synchronization of a redundant data channel 42 or reacquiring synchronization of a redundant data channel that has lost synchronization lock, and repeats at a rate slower than a transmission rate of the respective synchronization field 50 associated with each header block 46. In this example, the first and second RF nodes 22, 32 may define a point-to-point communication link. It is also possible that at least one other RF node 60 shown as RF node "n" also having an "n" RF transceiver 62, controller 64, and antenna 66, which forms a mesh network as illustrated generally at 70.

Figure 3:
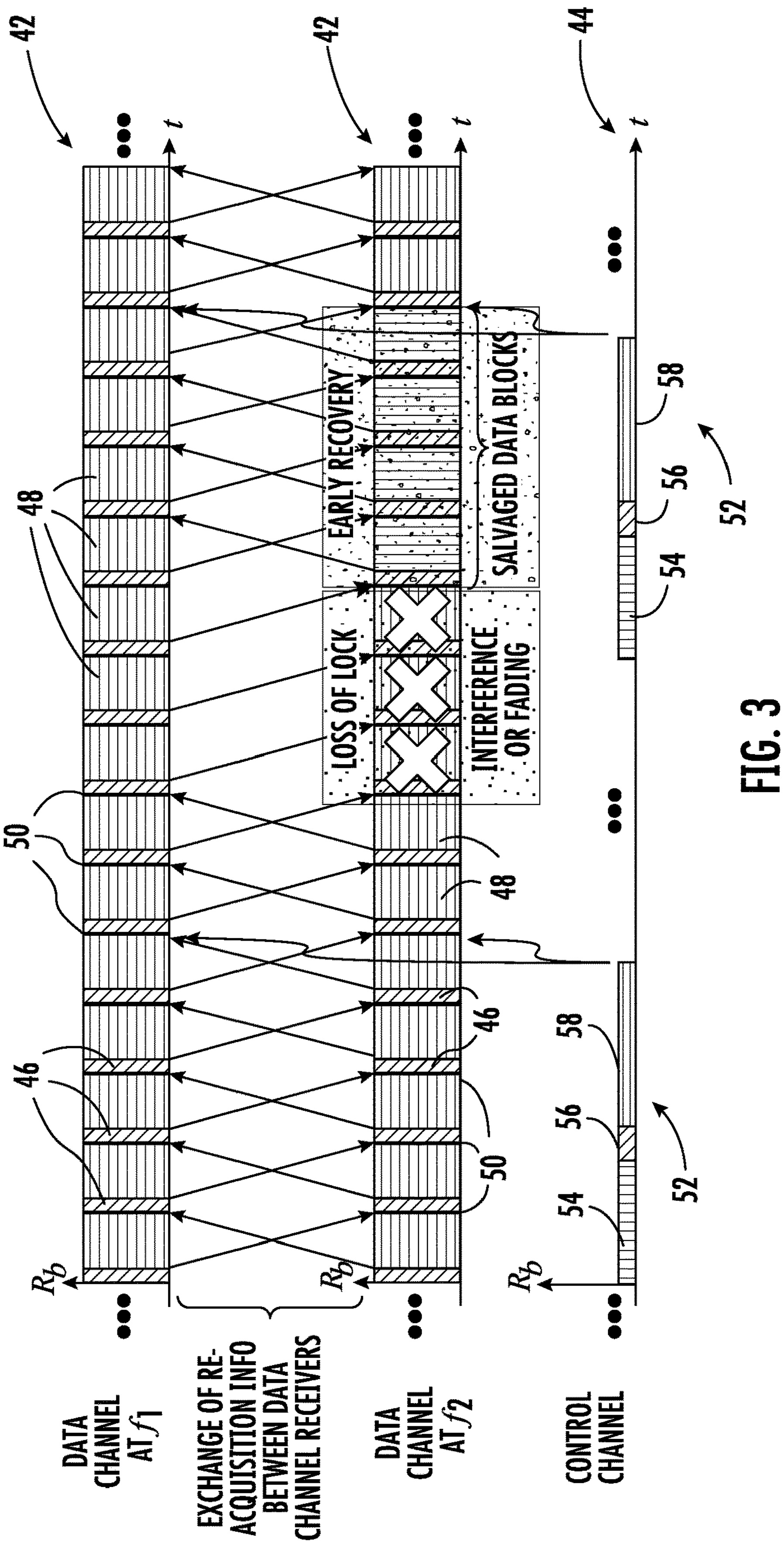
FIG. 3 is a schematic diagram showing redundant data channels and reacquisition of synchronization lock on a disrupted redundant data channel that lost synchronization lock.
Figure 4:
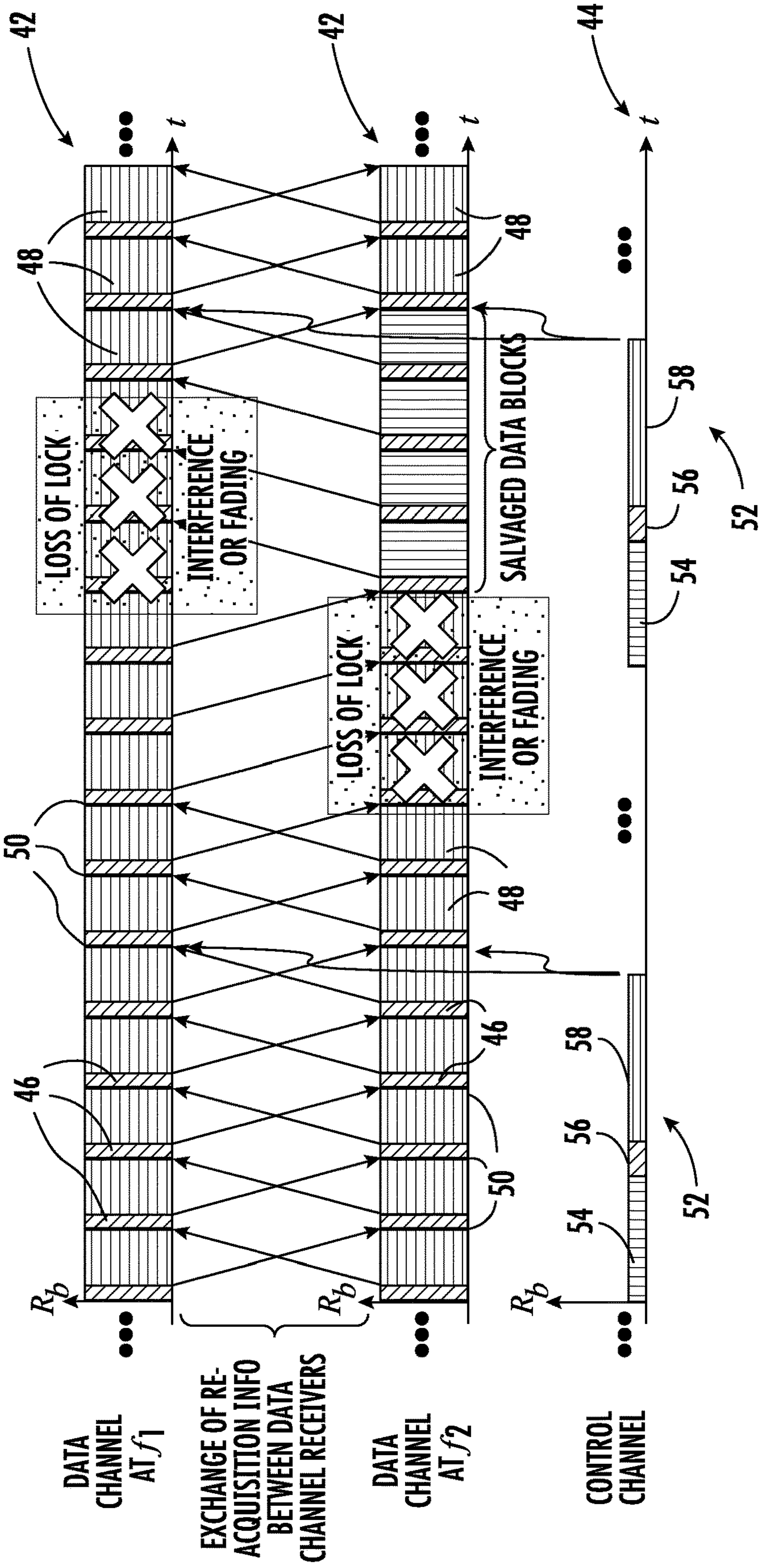
FIG. 4 is for another schematic diagram similar to FIG. 3, but showing loss of synchronization lock on both data channels and reacquisition of the synchronization lock on one of the data channels.

Referring now to FIGS. 3 and 4, there are illustrated schematic diagrams showing the reacquisition of synchronization lock for a disrupted redundant data channel based upon data within another redundant data channel. As illustrated, a first data channel 42 is transmitted at a first frequency f1 and a second data channel 42 at a second frequency f2. The control channel 44 is shown at the bottom of the second data channel operating at f2.

The reacquisition information is exchanged between different receiver circuits that may be part of the second RF transceiver 34 at the second RF node 32, such as in the first example of FIG. 3. This example of FIG. 3 shows the loss of synchronization lock due to interference or fading of the second data channel 42 at the second frequency f2, but includes a fast recovery of this second data channel because there is no threat of losing data due to the frequency diversity redundancy and an early recovery with the salvaged data blocks.

The diagrams in FIGS. 3 and 4 are not drawn to scale. In the schematic diagrams of FIGS. 3 and 4, the acquisition block 52 has the arrows pointing to the location in the data channel 42 at which the particular header block 46 is located. Using this information, it is easy to see that the second data channel 42 at f2 can recover its synchronization using the header information 50 from the first data channel 42 at f1 before (or at a faster time interval) than the control channel 44 can send another acquisition block 52.

The header block 46 in each data channel 42 includes information about the length of its payload as a data block 48 following each header block. As shown in the example of FIG. 3, the interference or fading occurs on the second data channel 42 operating at f2. After the interference or fading has passed, the second RF transceiver 32, as an example, determines from the first data channel 42 operating at f1 and its synchronization field 50 the information required to permit the second RF node 32 to reacquire synchronization lock on the second data channel 42 at f2, from that information received from the first data channel 42 at f1. This allows early recovery of data as shown by the section in FIG. 3 entitled "Salvaged Data Block" because of the reacquisition of synchronization lock.

The data in the respective synchronization field 50 associated with each header block 46 for a data channel 42 operates at the first frequency f1, and in an example, is a short field that allows a reacquiring receiver to find the beginning of the header block, assuming that the receiver obtained the reacquisition data either from the other data channel receiver or the control channel. Besides the timing of the next header block, part of the acquisition information that is required is the center frequency of the data channel that lost lock. In the time sequence illustrated in FIGS. 3 and 4, the acquisition block 52 on the control channel 44 arrives later.

In the schematic diagram of FIG. 3, the salvaged data blocks are illustrated since the information in the acquisition block 52 from the control channel 44 has not yet arrived, and thus, the second RF node 32 would not be able to use any information from the control channel 44. The control channel 44 is still important in these cases, however, when new RF nodes want to enter the mesh network 70 formed by multiple RF nodes. Synchronization lock is required for any new RF nodes to enter the mesh network 70 and communicate with other RF nodes in the mesh network.

The RF communications system 20 may provide frequency agility. Channel center frequencies for the data channels 42 may be changed dynamically without waiting for an acquisition block 52 on the control channel 44. If one of the redundant data channels 42 misses the message to change frequency due to loss of synchronization lock, it would normally have to wait until the next acquisition block 52 in the control channel 44. This is not necessary since frequency information is processed within receiver circuits of the second RF transceiver 34 at the second RF node 32, and those receiver circuits process the data from redundant data channels 42 at the respective different frequencies such as f1 and f2.

The schematic diagram of FIG. 4 shows an example of the same two data channels 42 of FIG. 3 operating at separate frequencies f1 and f2, where the interference or fading causes loss of synchronization lock on both the first and second data channels. In this example, the first and second data channels 42 both lose information and synchronization lock, and if the acquisition block 52 on the control channel 44 was used for synchronization lock, then there would be complete loss of data. The RF communications system 20, however, includes the redundant data channels 42 having the synchronization field 50 associated with each header block 46. Each data receiver tracks information for the other receiver, including frequency, and provides it prior to each header. It is thus possible to reacquire the synchronization lock for both data channels 42 as shown in the schematic diagram of FIG. 4. The salvaged data blocks are illustrated.

Figure 5:
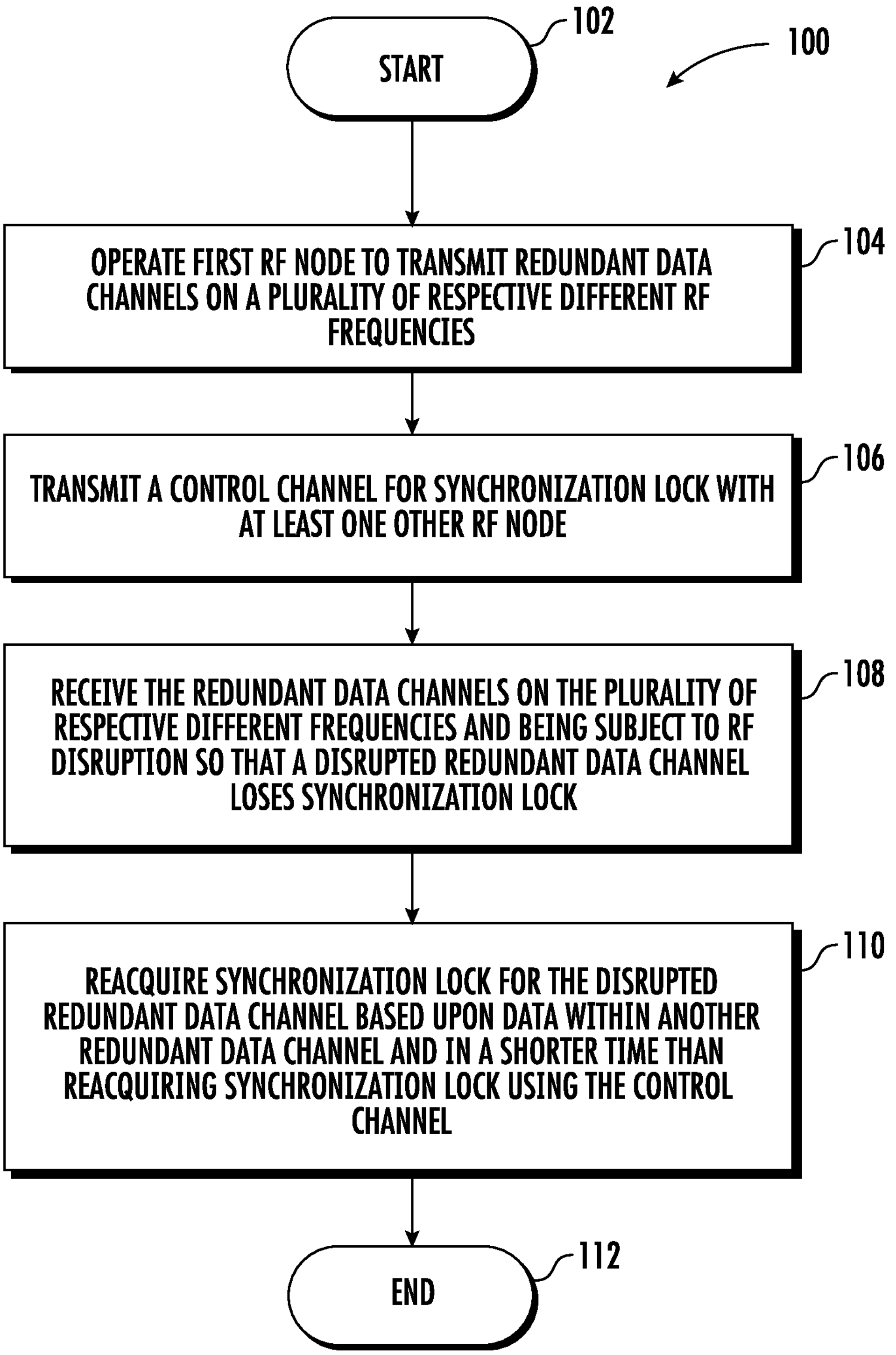
FIG. 5 is a high-level flowchart showing an example of RF communications using the RF communication system of FIG. 1.

Referring now to FIG. 5, a high-level flowchart is illustrated at 100 and shows a method of RF communications using the RF communications system 20 illustrated in FIG. 1. The process starts (Block 102) and the first RF node 22 transmits redundant data channels 42 on a plurality of respective different RF frequencies (f1 and f2) (Block 104). This first RF node 22 also transmits a control channel 44 for synchronization lock with at least one other RF node, such as the second RF node 32 (Block 106).

The second RF node 32 receives the redundant data channels 42 on the respective different frequencies f1 and f2. The redundant channels 42 are subject to RF disruption at the second RF node 32 so that a disrupted redundant data channel loses synchronization lock (Block 108). The second RF node 32 also reacquires synchronization lock for the disrupted redundant data channel 42 based upon the data within another redundant data channel and in a shorter time than reacquiring synchronization lock using the control channel 44 (Block 110). The process ends (Block 112).

The RF communications system 20 as described is applicable with frequency diverse communications systems, such as a communications system that employs the Advanced Tactical Data Link (ATDL) waveform and incorporates a control channel 44 where there are relatively infrequent acquisition signals. The RF communications system may be used in a time division duplex (TDD) fashion, where all RF nodes transmit at the same center frequency but in bursts at different times. Alternatively, the RF communications system may be used in a frequency division duplex (FDD) fashion, where the transmitter and receiver operate continuously using non-overlapping frequency bands.

The data blocks 48 transmitted within the different data channels 42 each include the respective adjacent synchronization fields 50 and header blocks 46 that predict the timing of the next header.

Some candidate waveforms that could be incorporated for use with the communications system 20 do not require spreading, but could incorporate an unspread signal instead, such as quadrature phase shift keyed (QPSK) signal. Also, the RF communications system 20 does not have to incorporate TRANSEC (Transmission Security), nor maintain frequency agility, but could use different spatially diverse systems. When incorporating frequency and spatial diversity, the RF communications system 20 is applicable for use with the ATDL Standard. Both spreading and frequency hopping are possible operational modes and are forms of TRANSEC.

Figure 6:
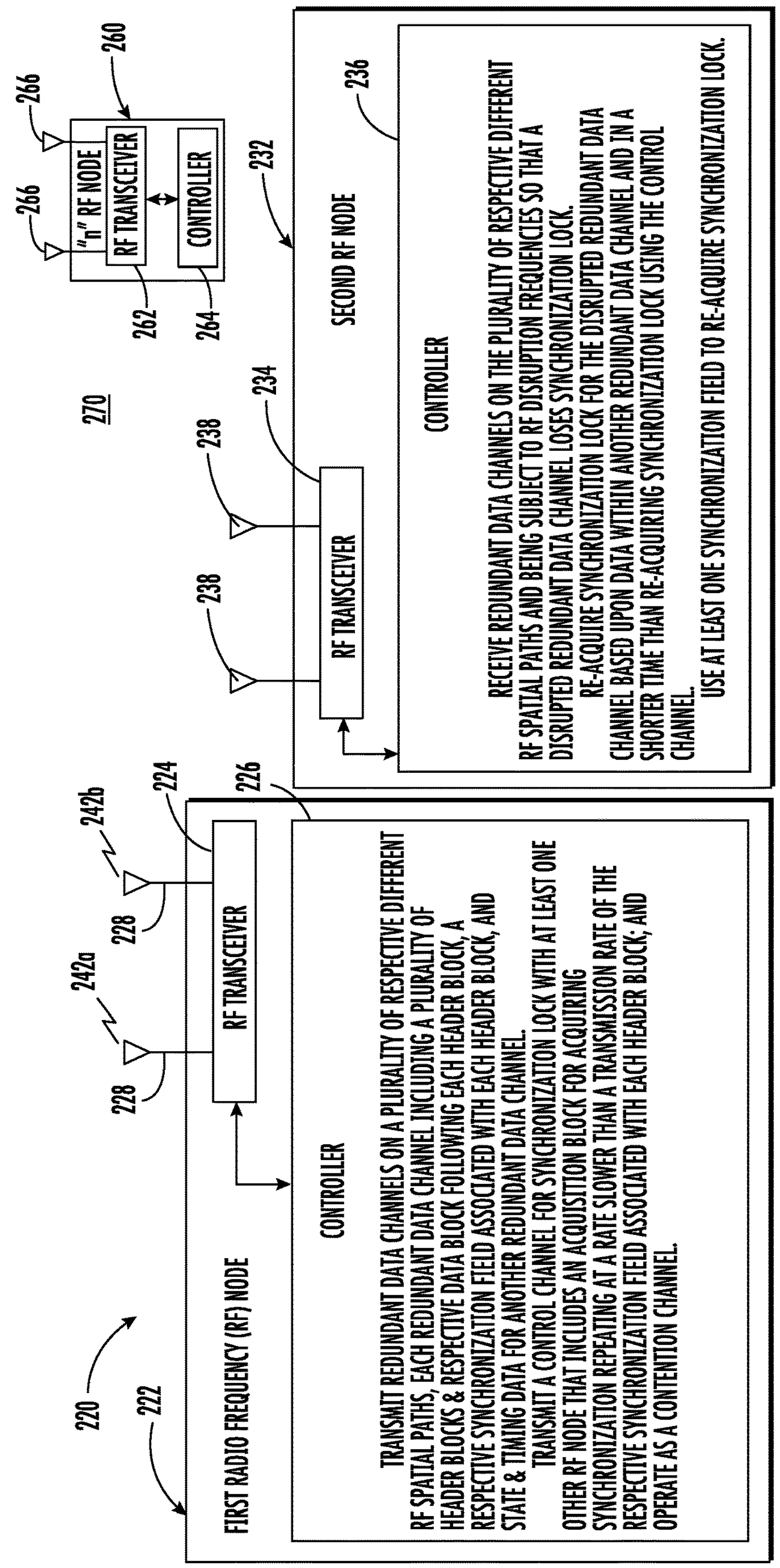
FIG. 6 is another high-level block diagram of the RF communications system showing RF nodes that reacquire synchronization lock on redundant data channels having different RF spatial paths in accordance with a non-limiting example.

The RF communications system 20 as described may incorporate point-to-point communication links, e.g., two aircraft using frequency diversity, or as in the example described relative to FIG. 6, use spatial diversity and different RF spatial paths for redundant data channels and different antennas located on different sections of an airframe, for example. The redundant data channels may be multiplexed in some way to be received by another RF node. For example, the transmitting node may use one or a combination of the following multiple access schemes: code division (e.g., ATDL), frequency division (optional with ATDL), and time division. Different waveforms may be applied, and in a non-limiting example, the ATDL waveform is used with the RF communications system 20 and is described below in detail.

The ATDL waveform is a dynamic CDMA-based waveform that is applicable especially in a mesh network 70 as shown in the RF communications system 20 of FIG. 1, and also described below with reference to the RF communications system 220 of FIG. 6, using different RF spatial paths. The ATDL waveform incorporates one or more control channels 44 and one or more data channels 42, where there is an option for two redundant data channels transmitted at first and second frequencies in the example shown in FIGS. 3 and 4.

The control channel 44 operates at a low data rate and low power, and it provides the necessary information to acquire the data channel 42, which some skilled in the art also refer to as the traffic channel. The data channel 42 may operate at the same or at a different center frequency from the control channel 44. The ATDL waveform standard allows for redundant data signals to be transmitted as separate data channels 42 for transmit-side diversity on different RF frequencies. The redundant data signals may also be transmitted by separate antennas for the respective different RF spatial paths as shown in the RF communications system 220 of FIG. 6. As noted before, the redundant data signals as separate data channels 42 may be transmitted at different center frequencies.

The control channel 44 carries the acquisition block 52 for allowing an RF node to acquire synchronization semi-periodically, and in the examples of the RF communications system 20 of FIG. 1, repeating at a rate slower than a transmission rate of the respective synchronization field 50 associated with each header block 46. The period of the acquisition block 52 may be on the order of seconds.

The control channel 44 is shown schematically at FIGS. 2-4 and carries the transmitted acquisition block 52 having the preamble 54, header 56, and an acquisition data 58. The preamble 54 is a sequence that can be readily detected by an RF node, e.g., the second RF transceiver 34 at the second RF node 34 in FIG. 1. The header 56 identifies the type of acquisition data 58 that will follow. For example, the acquisition data 58 contains information that the second RF transceiver 34 at the second RF node 32 or other RF node requires to transition to the data channel 42 such as the timing, the seed value for a pseudo-random spreading sequence, the frequency, the data rate, and the waveform modulation type (e.g., BPSK, QPSK, etc.). Each control channel acquisition data 58 provides this information for all active redundant data channels 42.

In addition to the acquisition block 52 with its preamble 54, header 56, and acquisition data 58, other data may be present on the control channel 44. For example, the control channel 44 may operate as a contention control channel, and the low data rate of the control channel and the presence of other data are factors may lead to the relatively long acquisition block period.

Each data channel 42 as shown in the examples of FIGS. 2-4, includes the header block 46 and payload or data block 48. Each header block 46 starts with its synchronization field 50. The synchronization field 50 allows the second RF transceiver 34 at the second RF node 32 in this example to resolve timing offsets when the center frequency is changed or when the second RF transceiver 24 is trying to reacquire synchronization lock following a loss of synchronization lock in one of the data channels. The second RF transceiver 32 in this example at the second RF node 32 will either wait for the next acquisition block 52 on the control channel 44 to reestablish the communications link, or it can use information from a redundant data channel to regain synchronization lock as explained with reference to the RF communications system 20 of FIG. 1, for example.

The data channel 42 when incorporating the ATDL waveform is dynamic because several parameters can change on-the-fly. For example, the data channel 42 may change its center frequency, data rate, modulation type, and payload length. These waveform changes are signaled in the header blocks 46 that precede each payload, i.e., data block 48. In order to keep the overhead associated with the header block 46 to a reasonable level, the waveform changes are generally specified relative to the previous data block 48 state.

The waveform state may be specified in absolute terms after an acquisition block 52 on the control channel 44. Specifying the absolute state may be necessary for an RF transceiver that tries to enter the mesh network 70 and acquire the data channel 42 for the first time, or after losing synchronization lock, and the synchronization field 50 is not employed as part of the header block 46 in communications. Given the dynamic nature of the ATDL waveform, it is necessary for an RF node to properly detect each header block 46 in order to maintain synchronization lock. For example, if a header block 46 is not detected properly by an RF node, then that RF node may not know how to decode and detect the payload or data block 48 that follows. In addition, that RF node will not know the length of the data block 48, so it will not know when the next header block 46 begins.

As a CDMA signal, the data channel 42 is spread in frequency using a sequence of chips. Each symbol is spread by a specific number of chips that will maintain the allocated bandwidth. Hence, lower data rate symbols may be spread with more chips than higher data rate symbols. The pseudo-random spreading sequence is long and known to all RF nodes in the mesh network 70, but the position in that sequence is randomly selected by an RF transceiver, such as at the first RF node 22 that begins upon initialization.

If there are multiple traffic, i.e., data channels 42 being used for frequency and/or spatial diversity, each data channel may have a different starting point in the spreading sequence. This random sequence does not require RF nodes in the mesh network 70 to synchronize their transmission as is done for some hub-spoke topologies. Due to the length of the spreading sequence, any RF node initially must be signaled where to look in order to properly receive the signal. After acquiring the signal, the RF node can track the spreading sequence since it is known to all RF nodes.

Whether frequency or spatial diversity are used, the same header block 46 and payload or data block 48 are transmitted on the redundant data channels 42. Due to this redundancy, the timing of the header block 46 and payload or data blocks 48 may be identical. The only information in the header block 46 that may be unique to a particular channel is the center frequency. However, the header block 46 may contain the center frequencies of all data channels 42 that are associated with a frequency change, which is the information that allows the RF nodes to track.

Referring now to FIG. 6, there is illustrated an RF communication system generally at 220 that shows its first RF node 222 configured to transmit redundant data channels 242 on a plurality of respective different RF spatial paths illustrated by the two signal paths 242*a*, 242*b* generated from two separate antennas 228 at the first RF node. This RF communications system 200 uses spatial diversity, such as transmitting from the two different antenna 228 located on an aircraft or other RF node site, and may use spreading, or frequency diversity, or time diversity techniques to distinguish signals between different antennas.

This first RF node 222 is also configured to transmit a control channel such as the type shown in FIG. 2 for synchronization lock with at least one other RF node, such as the illustrated second RF node 232 or a third or “n” RF node 260. Each RF node 222, 232, 260 includes its respective RF transceiver 224, 234, 262 and controller 226, 236, 264 connected thereto.

For purposes of illustration, the RF communications 220 system shown in FIG. 6 is described with reference numerals beginning in the 200 series with the reference numerals following closely the reference numerals shown in FIG. 1 but in the 200 series. Because spatial diversity is used, each RF transceiver 224, 234, 262 includes at least two antennas 228, 238, 266, such as in the example of an aircraft, and may be located on the top and bottom surfaces of the fuselage.

In this example, the second RF node 232 is configured to receive the redundant data channels 242*a*, 242*b* on the plurality of respective different spatial paths and is also subject to RF disruption, such as described with reference to FIG. 1, so that a disrupted redundant data channel 242*a*, 242*b* loses synchronization lock. The second RF node 232 may reacquire synchronization lock for the disrupted redundant data channel 242*a*, 242*b* based upon data within another redundant data channel and in a shorter time than reacquiring synchronization locks using the control channel 244. Because a receiver also has two antennas, the data channels 242*a*, 242*b* as signals may be received on either of the receiver's antenna, depending on the RF blockages or interference.

Similar to the RF communications system 20 described with reference to FIG. 1, the RF communications system 220 uses spatial diversity, and each redundant data channel 242*a*, 242*b* includes a plurality of header blocks 246 and a respective data block 248 following each header block. Each redundant data channel 242 may include a respective synchronization field 250 associated with each header block 246. The second RF node 232 uses at least one synchronization field 250 to reacquire synchronization lock along with the data provided from the data channel that still has synchronization lock.

Figure 7:
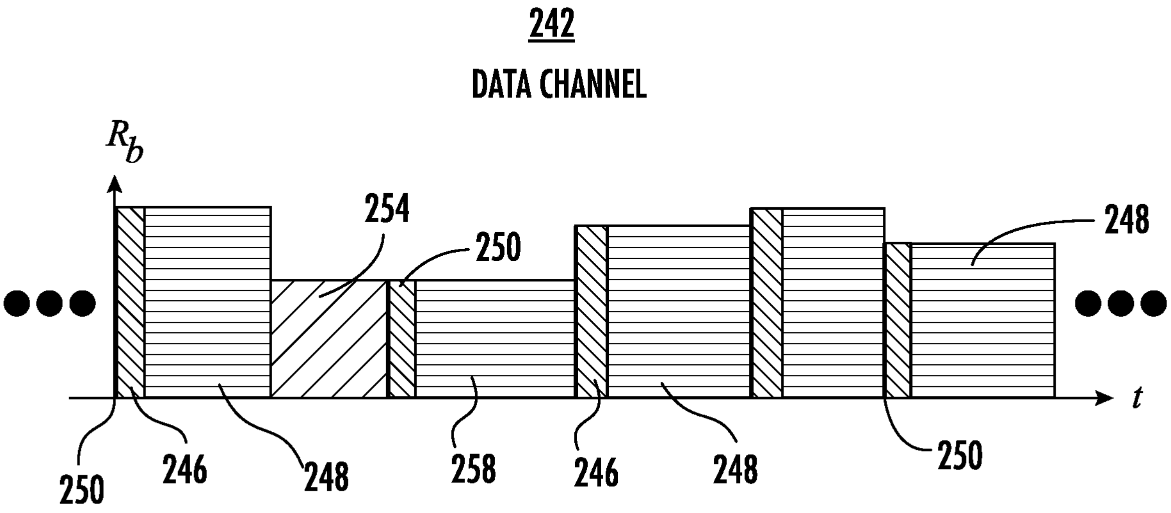
FIG. 7 is a time versus rate plot of a data channel and control channel that may be used in the RF communications system of FIG. 1 or FIG. 6.

As shown in FIG. 7, the data channel 242 includes the header block 246, data block as a payload 248, a preamble 254, and in this example, acquisition block as acquisition data 258. As illustrated, a plurality of header blocks 246 occur at a first frequency. Each header block 246 includes a synchronization field 250 associated therewith.

The acquisition block 258 occurs at a second frequency less than the first frequency. The second RF node 232 as shown in FIG. 6 is configured to receive the redundant data channels 242*a*, 242*b* on the plurality of different RF spatial paths and are subject to RF disruption so that a disrupted redundant data channel loses synchronization lock. The second RF node 232 reacquires synchronization lock for the disrupted redundant data channel based upon the synchronization field 250 in another redundant data channel and in a shorter time than reacquiring synchronization lock using the acquisition block 258. As noted before, each redundant data channel includes a respective data block 248. The data channel 242 shown in FIG. 7 may be used with the described frequency diversity and spatial diversity systems.

When the control channel is used as in FIG. 2, the control channel includes an acquisition block for acquiring synchronization repeating at a rate slower than a transmission rate of the respective synchronization field associated with each header block. The RF nodes may define a mesh network 270 as shown in FIG. 6, including the "n" RF node 260 or define a point-to-point communication link. Each RF node 222, 232, 260 includes two respective RF antenna 228, 238, 266, e.g., one for each different RF spatial path as shown in the block diagram of FIG. 6 in which two different antennas are illustrated for each RF node. Those of skill in the art will recognize that a single receive antenna may be used with a pair of transmit antennas and vice versa in other embodiments.

Figure 8:
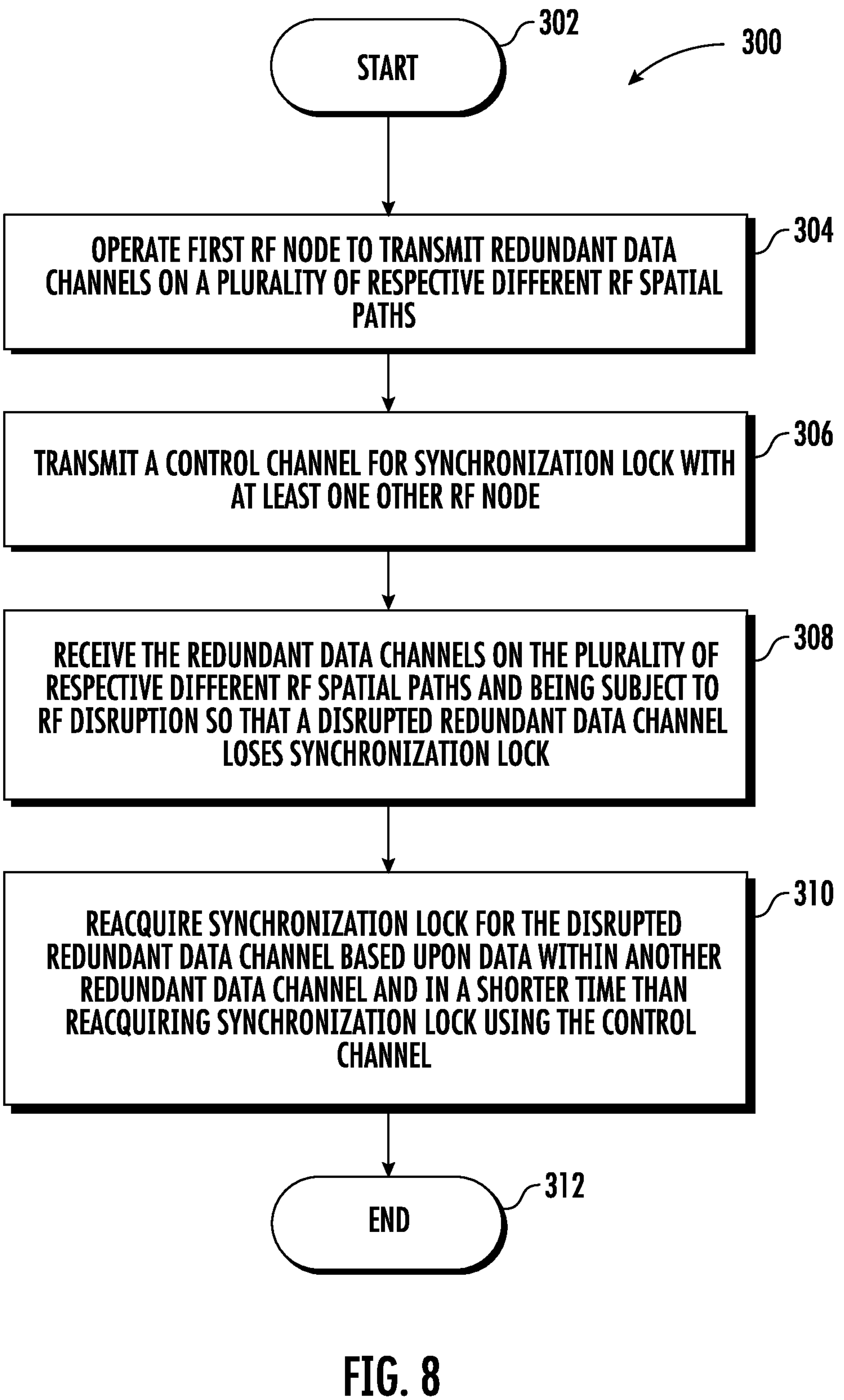
FIG. 8 is a high-level flowchart showing an example of RF communications using the RF communications system of FIG. 6.

Referring now to FIG. 8, a high-level flowchart is illustrated at 300 and shows a method of RF communications using spatial diversity as in the RF communications system 220 shown in FIG. 6. The process starts (Block 302) and the first RF node 222 transmits redundant data channels 242 on a plurality of respective different RF spatial paths 242*a*, 242*b* (Block 304). The first RF node 222 also transmits a control channel 244 for synchronization lock with at least one other RF node (Block 306). A second RF node 232 receives the redundant data channels 242 on the plurality of respective different spatial paths 242*a*, 242*b* and is subject to RF disruption so that a disrupted redundant data channel loses synchronization lock (Block 308). The second RF node 232 reacquires synchronization lock for the disrupted redundant data channel 242 based upon data within another redundant data channel and in a shorter time than reacquiring synchronization lock using the control channel 244 (Block 310). The process ends (Block 312).

This application is related to copending patent application entitled, "RADIO FREQUENCY (RF) COMMUNICATIONS SYSTEM HAVING RF NODES THAT REACQUIRE SYNCHRONIZATION LOCK ON SPATIALLY DIVERSE, REDUNDANT DATA CHANNELS," which is filed on the same date and by the same assignee and inventors, the disclosure which is hereby incorporated by reference.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

The invention claimed is:

1. A radio frequency (RF) communications system comprising:

a first RF node configured to transmit redundant data channels on a plurality of respective different RF frequencies, and also configured to transmit a control channel for synchronization lock with at least one other RF node, wherein each redundant data channel comprises a plurality of header blocks and a respective data block following each header block, and a synchronization field associated with each header block and having no state and timing information, wherein one of the plurality of header blocks and data blocks are transmitted on a first data channel and another of the plurality of header blocks and data blocks are transmitted on a second data channel that is redundant to the first data channel, wherein the another of the plurality of header blocks and data blocks are the same as the one of the plurality of header blocks and data blocks and both the one and the another of the plurality of header blocks and data blocks have identical timing during transmission on the first and second data channels; and a second RF node configured to receive the redundant data channels on the plurality of respective different RF frequencies and being subject to RF disruption so that a disrupted redundant data channel loses synchronization lock, and reacquire synchronization lock for the disrupted redundant data channel based upon the synchronization field and data within another redundant data channel to determine start time of the synchronization field and in a shorter time than reacquiring synchronization lock using the control channel.

2. The RF communications system of claim 1 wherein the control channel comprises an acquisition block for acquiring synchronization repeating at a rate slower than a transmission rate of the respective synchronization field associated with each header block.

3. The RF communications system of claim 1 wherein each redundant data channel comprises state and timing data for another redundant data channel.

4. The RF communications system of claim 1 wherein the control channel operates as a contention control channel.

5. The RF communications system of claim 1 further comprising at least one other RF node defining a mesh network.

6. The RF communications system of claim 1 wherein the first and second RF nodes define a point-to-point communication link.

7. The RF communications system of claim 1 wherein each RF node comprises an RF transceiver and a controller coupled thereto.

8. A radio frequency (RF) communications system comprising:

a first RF node configured to transmit redundant data channels on a plurality of respective different RF frequencies, each redundant data channel comprising a plurality of header blocks occurring at a first frequency, each header block having a respective data block following each header block and a synchronization field associated therewith, said synchronization field having no state and timing information, wherein one of the plurality of header blocks and data blocks are transmitted on a first data channel and another of the plurality of header blocks and data blocks are transmitted on a second data channel that is redundant to the first data channel, wherein the another of the plurality of header blocks and data blocks are the same as the one of the plurality of header blocks and data blocks and both the one and the another of the plurality of header blocks and data blocks have identical timing during transmission on the first and second data channels, and an acquisition block occurring at a second frequency less than the first frequency; and a second RF node configured to receive the redundant data channels on the plurality of respective different RF frequencies and being subject to RF disruption so that a disrupted redundant data channel loses synchronization lock, and reacquire synchronization lock for the disrupted redundant data channel based upon the synchronization field and data within another redundant data channel to determine start time of the synchronization field and in a shorter time than reacquiring synchronization lock using the acquisition block.

9. The RF communications system of claim 8 further comprising at least one other RF node defining a mesh network.

10. The RF communications system of claim 8 wherein the first and second RF nodes define a point-to-point communication link.

11. The RF communications system of claim 8 wherein each RF node comprises an RF transceiver and a controller coupled thereto.

12. A method of radio frequency (RF) communications comprising:

operating a first RF node to transmit redundant data channels on a plurality of respective different RF frequencies, and also to transmit a control channel for synchronization lock with at least one other RF node, wherein each redundant data channel comprises a plurality of header blocks and a respective data block following each header block, and a synchronization field associated with each header block and having no state and timing information, wherein one of the plurality of header blocks and data blocks are transmitted on a first data channel and another of the plurality of header blocks and data blocks are transmitted on a second data channel that is redundant to the first data channel, wherein the another of the plurality of header blocks and data blocks are the same as the one of the plurality of header blocks and data blocks and both the one and the another of the plurality of header blocks and data blocks have identical timing during transmission on the first and second data channels; and operating a second RF node to receive the redundant data channels on the plurality of respective different RF frequencies and being subject to RF disruption so that a disrupted redundant data channel loses synchronization lock, and reacquire synchronization lock for the disrupted redundant data channel based upon the synchronization field and data within another redundant data channel to determine start time of the synchronization field and in a shorter time than reacquiring synchronization lock using the control channel.

13. The method of claim 12 wherein the control channel comprises an acquisition block for acquiring synchronization repeating at a rate slower than a transmission rate of the respective synchronization field associated with each header block.

14. The method of claim 12 wherein each redundant data channel comprises state and timing data for another redundant data channel.

15. The method of claim 12 wherein the control channel operates as a contention control channel.

16. The method of claim 12 further comprising at least one other RF node defining a mesh network.

17. The method of claim 12 wherein the first and second RF nodes define a point-to-point communication link.

* * * * *